(12) United States Patent
Ito (10) Patent No.: US 6,992,969 B2
(45) Date of Patent: Jan. 31, 2006

(54) OPTICAL PICKUP DEVICE WITH THREE ADHESIVE PARTS ON TWO PARALLEL SIDE FACES OF AN OPTICAL COMPONENT

(75) Inventor: Shin Ito, Hamamatsu (JP)

(73) Assignee: Yamaha Corporation, Shizuoka-ken (JP)

( * ) Notice: Subject to any disclaimer, the term of this patent is extended or adjusted under 35 U.S.C. 154(b) by 342 days.

(21) Appl. No.: 10/084,889

(22) Filed: Mar. 1, 2002

(65) Prior Publication Data

US 2003/0165108 A1 Sep. 4, 2003

(51) Int. Cl.
*G11B 7/135* (2006.01)
(52) U.S. Cl. ................................. 369/112.29
(58) Field of Classification Search ........... 369/112.16, 369/112.19, 112.29
See application file for complete search history.

(56) References Cited

U.S. PATENT DOCUMENTS

| | | | | |
|---|---|---|---|---|
| 4,719,614 A | * | 1/1988 | Leterme et al. | ........ 369/112.21 |
| 5,296,988 A | * | 3/1994 | Fujino | ........................ 360/110 |
| 5,872,662 A | * | 2/1999 | Lee | .............................. 359/824 |
| 2002/0118628 A1 | * | 8/2002 | Tachikawa et al. | .... 369/112.29 |

* cited by examiner

*Primary Examiner*—Brian E. Miller
*Assistant Examiner*—Peter Vincent Agustin
(74) *Attorney, Agent, or Firm*—Reed Smith LLP; Stanley P. Fisher, Esq.; Juan Carlos A. Marquez, Esq.

(57) ABSTRACT

In an optical pickup device, reliability of a holding structure for an optical component (a half mirror) with respect to a pair of mounting frames is intended to be enhanced. A half mirror (5) is arranged so as to bridge a first frame (11) and a second frame (12). A side face (5C) positioned in a part in which one side of an emitting face (5B) (a mounting face) of this half mirror 5 and the first frame (11) are overlapped is fixed to the first frame (11) by adhesives (13A) of two contact points. On the other hand, a side face (5) positioned in a part in which the other side of the emitting face (5B) and the second frame (12) are overlapped is fixed to the second frame (12) by an adhesive (13B) of one contact point. In this manner, even in case where the frames (11, 12) have been displaced due to thermal expansion, the adhesives (13A, 13B) will not be flaked off, and bonding strength of the half mirror will be enhanced.

17 Claims, 8 Drawing Sheets

OPTICAL PICKUP DEVICE WITH THREE ADHESIVE PARTS ON TWO PARALLEL SIDE FACES OF AN OPTICAL COMPONENT

BACKGROUND OF THE INVENTION

The present invention relates to an optical pickup device which is advantageous when employed in, for example, an optical disk apparatus, a magneto-optic disk apparatus or the like.

Generally, a memory storage apparatus such as the optical disk apparatus, the magneto-optic disk apparatus or the like (hereinafter referred to as an "optical disk apparatus") is provided with an optical pickup device for recording and/or reproducing data.

The optical pickup device is generally constructed by assembling optical components in a box. In order to incorporate this optical pickup device in a main body of the optical disk apparatus, it is necessary to make this box small-sized. For this reason, in a related optical pickup device, the optical components to be fixed in the box have been fixed only by adhesives or only with pressure by biasing members such as springs, without employing tight fixation members such as screws, nuts, small screws, etc.

Therefore, there has been such an anxiety that when the optical components, especially, a deflecting mirror or a deflecting prism are attached to the support box by the adhesives, they tend to be displaced from positions to be fixed to the box by shrinkage or expansion of the adhesives, resulting in deterioration in their accuracy, though the optical components have excellent accuracy by themselves. In the optical pickup device employing the optical components which have thus deteriorated in accuracy, there may happen, in some cases, such an inconvenience that a spot diameter of a beam or a direction of an optical axis cannot be always constant.

Figure 12:
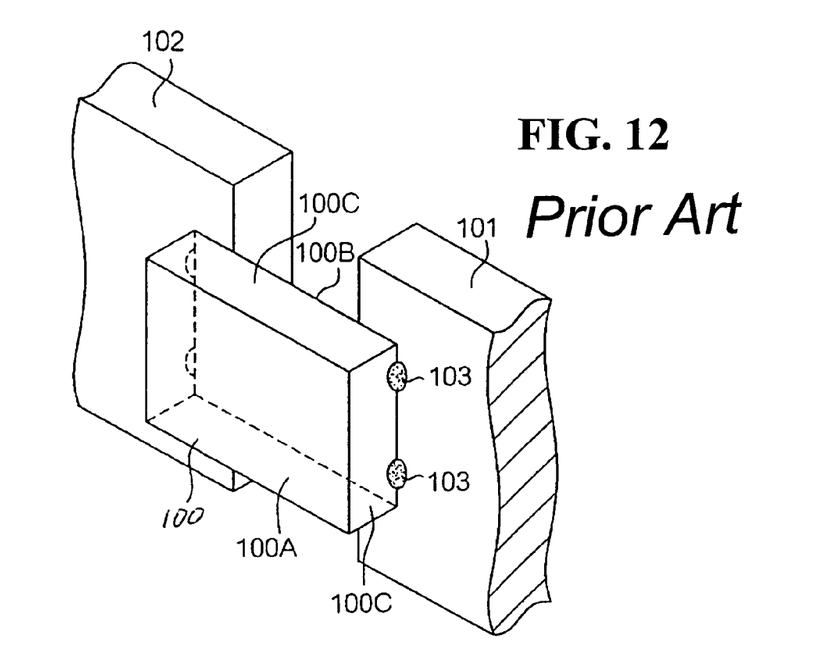
FIG. 12 is a perspective view of a half mirror according to a conventional art in a state attached to frames.
Figure 13:
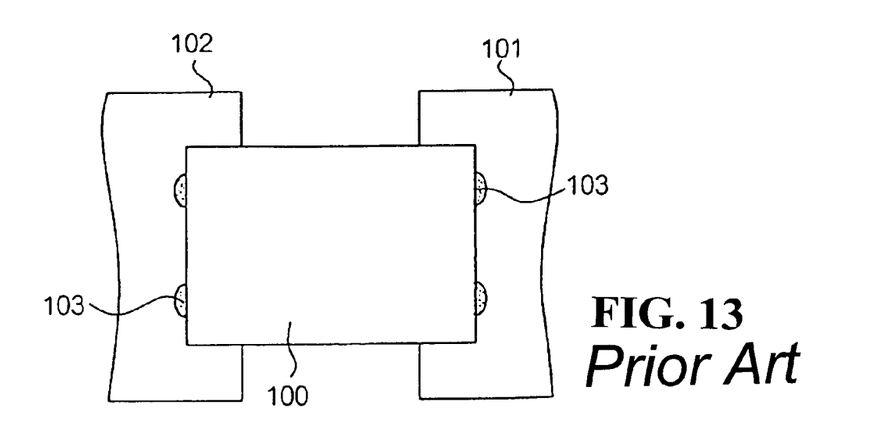
FIG. 13 is a front view of the half mirror according to the conventional art in a state attached to the frames.

In order to solve such a problem, various methods have been proposed as methods for fixing the optical components. FIGS. 12 and 13 show one example of such methods.

FIG. 12 is a perspective view of a half mirror as a polarizing member in a state fixed to support frames of the optical pickup device, and FIG. 13 is a front view of the half mirror of FIG. 12.

The half mirror 100 is one of the components constituting the optical pickup device, and fixed to a pair of mounting frames 101, 102 by adhesives 103.

The half mirror 100 is formed in a shape of a rectangular parallelepiped thin plate having an incidence face 100A, an emitting face 100B, and four side faces 100C intersecting these faces.

The adhesives 103 are applied to one of the mounting frames 101 at two contact points, and to the other mounting frame 102 at two contact points, four contact points in total, and positioned near four apexes of the emitting face 100B, on the side faces 100C which are opposed with respect to the emitting face 100B. With this arrangement, an influence on the half mirror 100 by shrinkage or expansion of the adhesives 103 is intended to be decreased.

By the way, the half mirror 100 and the mounting frames 101, 102 have different thermal expansion coefficients because they are formed of different materials. For this reason, when heat is added to these members, there will occur expansions different in both the members. In particular, since the mounting frames 101, 102 are formed by die casting, the shrinkage and expansion of the mounting frames 101, 102 by thermal expansion are not constant because of materials, and they are sometimes displaced in a back and forth direction in FIG. 12. On such occasions, the emitting face 100B will be twisted and the adhesive 103 at one contact point among the adhesives 103 of the four contact points for fixing the half mirror 100 to the mounting frames 101, 102 is likely to be flaked off. It is concerned that an optical axis of the optical pickup device may be misaligned, in case where the adhesive has been flaked off.

SUMMARY OF THE INVENTION

The present invention has been made in view of the above described problem, and it is an object of the invention to provide an optical pickup device in which reliability of a holding structure for an optical component (a half mirror) with respect to a pair of mounting frames can be enhanced.

In order to solve the aforesaid object, the invention is characterized by having the following arrangement.

(1) An optical pickup device comprising:
a light source for irradiating a light;
a pair of mounting frames which are opposed to each other interposing a space for passing the light from the light source;
an optical component in a polyhedral shape which is mounted on the mounting frames in a partially overlapped manner and adapted to polarize the light; and
three adhesive parts, wherein two of the adhesive parts fix one of faces of the optical component, which are substantially parallel to an optical axis of the light, to one of the pair of mounting frames in two contact points, and one of the adhesive parts fixes the other face of the optical component, which are substantially parallel to an optical axis of the light, to the other mounting frame in one contact point.

(2) The optical pickup device according to (1), wherein the two of the adhesive parts provided on the one of the mounting frames are arranged remote from each other so that an area of a triangle whose apexes are defined by the three adhesive parts is increased.

(3) The optical pickup device according to (1), wherein a mounting face of the optical component to be attached to the mounting frames is formed in a rectangular shape, and the two of the adhesive parts are positioned near apexes of the mounting face.

(4) The optical pickup device according to (1), wherein the other mounting frame has a shorter width than the one of the mounting frames.

(5) An optical pickup device comprising:
a light source for irradiating a light;
a pair of mounting frames which are opposed to each other interposing a space for passing the light from the light source;
a half mirror in a shape of a rectangular parallelepiped thin plate which is mounted on the mounting frames in a partially overlapped manner and adapted to polarize the light; and
three adhesive parts, wherein two of the adhesive parts fix one of opposed faces of the half mirror to one of the pair of mounting frames in two contact points, and one of the adhesive parts fixes the other face of the half mirror to the other mounting frame in one contact point.

(6) The optical pickup device according to (5), wherein the two of fixing parts provided on the one of the mounting frames are arranged remote from each other so that an area of a triangle whose apexes are defined by the three fixing parts may be increased.

(7) The optical pickup device according to (5), wherein a mounting face of the half mirror to be attached to the mounting frames is formed in a rectangular shape, and two of the fixing parts are positioned near apexes of the mounting face.

(8) The optical pickup device according to (5), wherein the other mounting frame has a shorter width than the one of the mounting frames.

(9) An optical pickup device comprising:
   a mounting frame; and
   a half mirror, wherein the half mirror is mounted onto the mounting frame with minimum number of contact points, the contact points substantially constituting a plane.

(10) An optical pickup device comprising:
   a mounting frame; and
   a half mirror, wherein the half mirror is mounted onto the mounting frame with three contact points.

(11) The optical pickup device according to (10), wherein the three contact points are arranged remote from each other.

(12) The optical pickup device according to (10), wherein the three contact points are positioned near corners of the half mirror.

(13) The optical pickup device according to (10), wherein an overlapping area between the mounting frame and the half mirror of one contact point has shorter area than that of two contact point side.

DETAILED DESCRIPTION OF THE PREFERRED EMBODIMENTS

Now, an embodiment according to the invention will be described referring to the drawings.

A. Structure of the Optical Pickup Device

Figure 1:
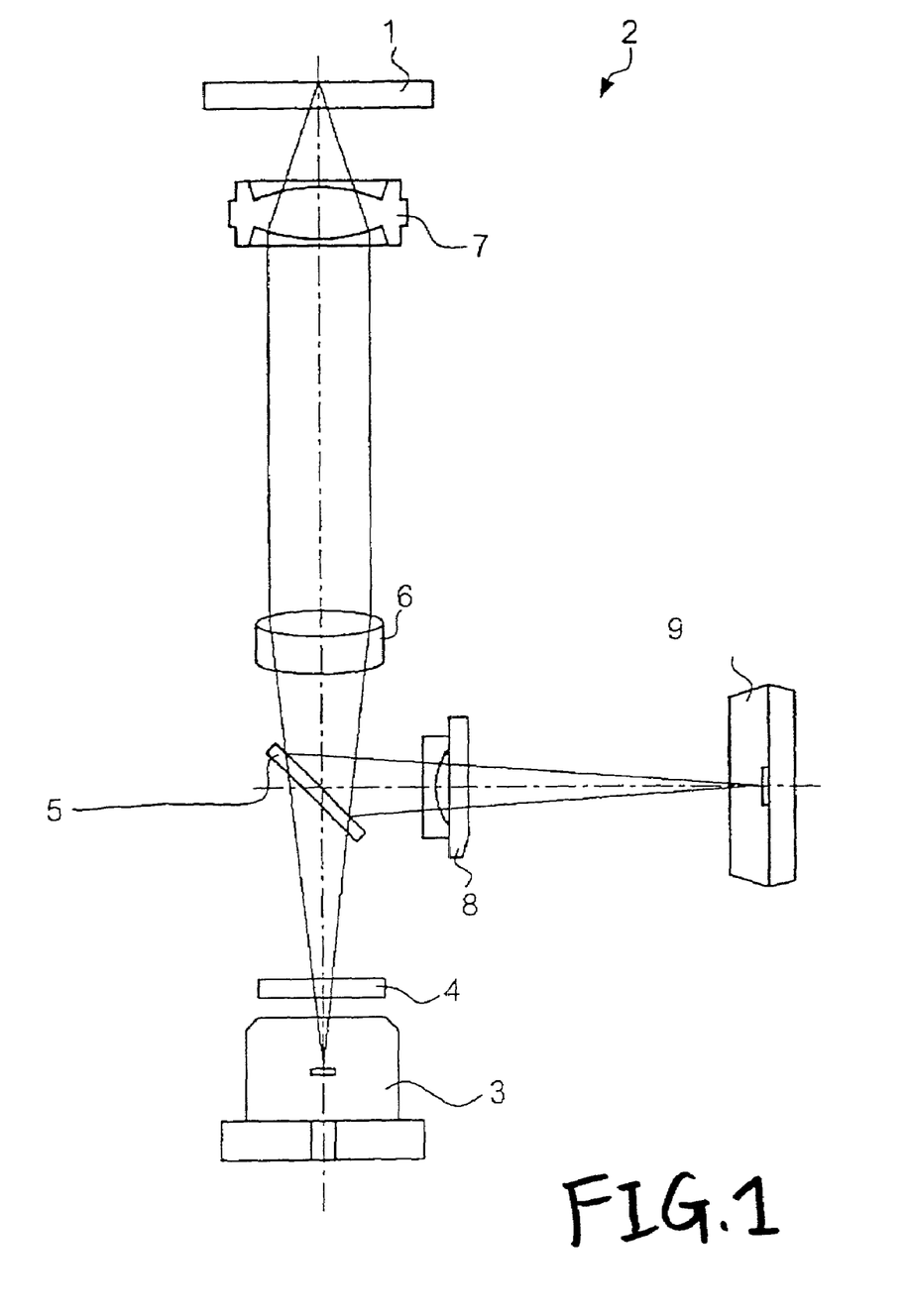
FIG. 1 is a block diagram showing an optical disk apparatus in which an optical pickup device according to an embodiment of the present invention is employed.

FIG. 1 relates to an optical disk apparatus according to an embodiment of the invention, and shows a schematic structure of its optical system. An optical disk 1 is a CD or CD-R disk, for example. An optical pickup device 2 for recording and reproducing the optical disk 1 includes a support box which is not shown in the drawing, a semiconductor laser 3, a diffraction grating 4, a half mirror 5, a collimator lens 6, an objective lens 7, a converging lens 8 and a photodiode 9 which are incorporated in the support box.

The optical system in the actual apparatus has a more complicated structure for conducting tracking control and so on. Because a tracking mechanism and so on which are necessary for reproducing and recording besides the above described structure are the same as in the known general optical pickup device. Therefore, its explanation will be omitted.

In this optical pickup device 2, a light beam from the semiconductor laser 3 is diffracted by the diffraction grating 4, passes through the half mirror 5, converted into a collimated beam, and irradiated to a lower face of the optical disk 1 through the objective lens 7. A reflected light beam from the optical disk 1 arisen by this irradiation passes through the objective lens 7 and the collimator lens 6, is then reflected by the half mirror 5, and converged on the photodiode 9 by the converging lens 8.

The optical pickup device 2 according to the present embodiment has a characteristic feature in amounting structure of the half mirror 5 which will be described below. Other structures than the mounting structure are the same as in the general optical pickup device, and therefore, their detailed description will be omitted.

B. Manner of Mounting the Half Mirror

Figure 2:
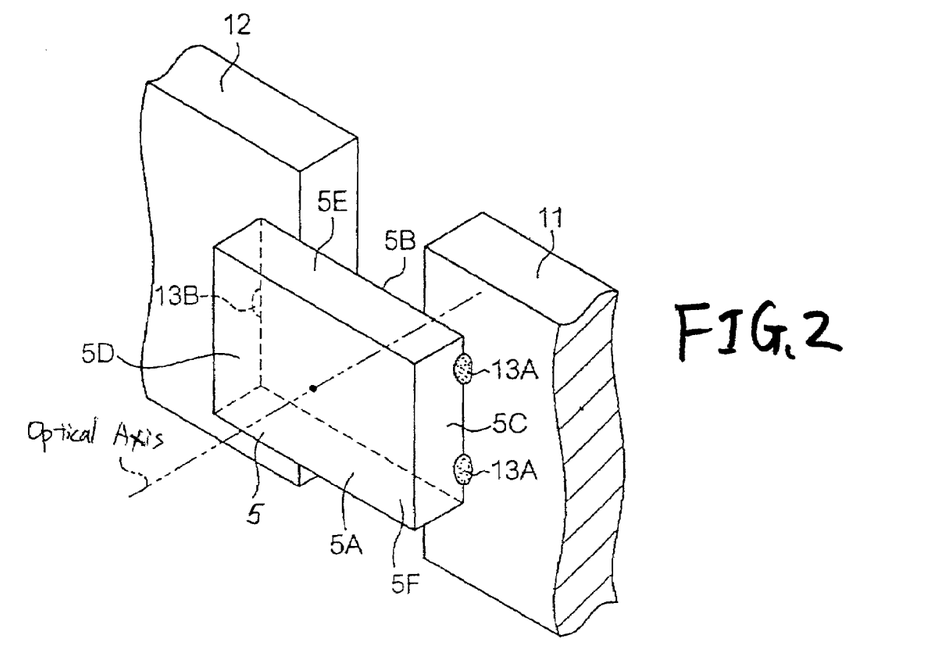
FIG. 2 is a perspective view of a half mirror according to the above embodiment in a state attached to frames.

Then, referring to FIGS. 2 to 4, a state in which the half mirror 5 has been mounted will be described.

The half mirror 5 is formed in a shape of a rectangular parallelepiped thin plate having an incidence face 5A, an emitting face 5B, and side faces 5C, 5D and side faces 5E, 5F which intersect these faces 5A, 5B and are respectively opposed to each other.

A first frame 11 and a second frame 12 are arranged so as to be opposed interposing a space for passing the light beam (an optical axis) from the semiconductor laser 3 (a light source), and fixed by the support box which is not shown in the drawings.

Figure 4:
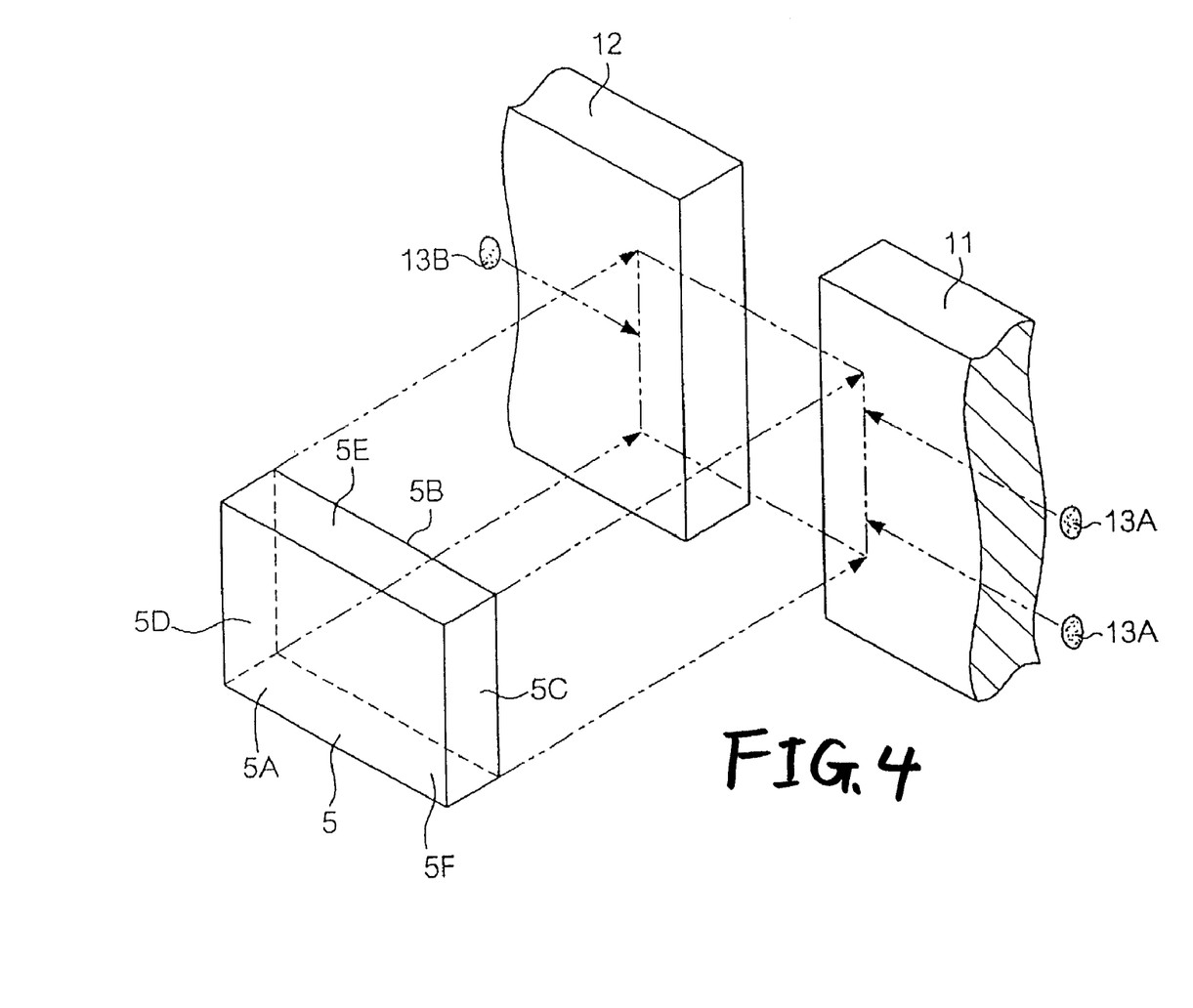
FIG. 4 is an exploded perspective view of the half mirror before it is fixed to the frame by adhesives at three contact points.

In this embodiment, as shown in FIG. 4, the frames 11, 12 and the half mirror 5 are partially overlapped and bonded to each other by adhesives 13A and 13B at three contact points. Specifically, the adhesives 13A of two contact points are applied to the side face 5C of the half mirror 5 which is positioned in the overlapped part of the half mirror 5 and the first frame 11, and the adhesive 13B of one contact point is applied to the side face 5D of the half mirror 5 which is positioned in the overlapped part of the half mirror 5 and the second frame 12.

By the adhesives 13A of the two contact points, the side face 5C which is positioned in the overlapped part of one edge of the emitting face 5B acting as a mounting face and the first frame 11 is fixed to the first frame 11. By the adhesive 13B of the one contact point, the side face 5D which is positioned in the overlapped part of another edge of the mounting face 5B and the second frame 12 is fixed to the second frame 12.

More specifically, the adhesives 13A of the two contact points are arranged at an end of the emitting face 5B near its two apexes, and the adhesive 13B of the one contact point is arranged at an end of the emitting face 5B in a center of its shorter edge. In this manner, by the three contact points composed of the adhesives, there is established an isosceles triangle having a distance L1 between the adhesives 13A of the two contact points, and a distance L2 between each of the adhesives 13A of the two contact points and the adhesive 13B of the one contact point (See FIG. 3).

It is to be noted that the terms "contact point" such as "two contact points" or "three contact points" herein called mean such areas as the fixation may be at least possible by the above described adhesives or the pressure contact.

C. Operation of the Embodiment

C-1. Influence of the Adhesives

In this embodiment, the half mirror 5 is fixed by means of the adhesives 13A and 13B of the three contact points which are dropped between the side faces 5C, 5D and the frames 11, 12. Accordingly, influence of shrinkage and expansion of the adhesives 13 on the half mirror 5 can be decreased.

C-2. Influence by Thermal Expansion

Now, description will be made concerning a case in which the frames 11, 12 have been displaced in a back and forth direction of FIG. 3, due to a difference in thermal expansion coefficients between the frames 11, 12 and the half mirror 5.

Figure 3:
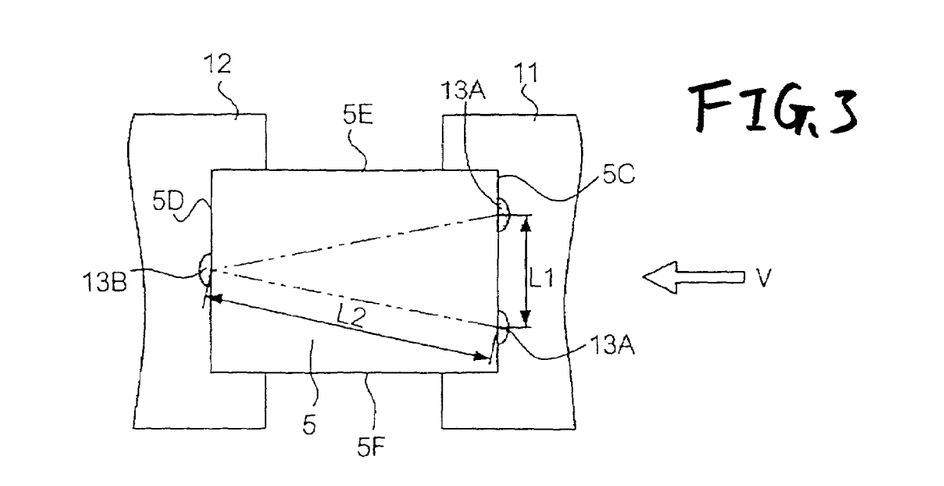
FIG. 3 is a front view of the half mirror according to the above embodiment in a state attached to the frames.
Figure 5:
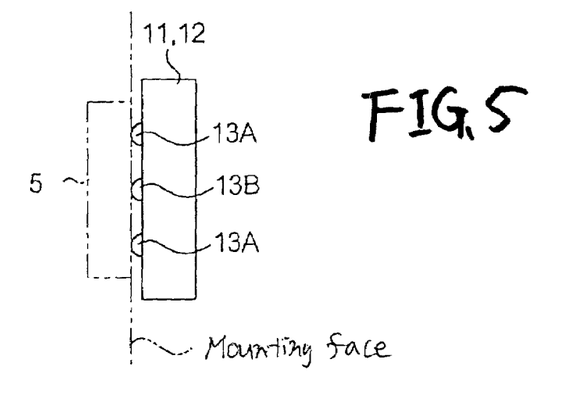
FIG. 5 is a view of the half mirror in a state attached to the frames, as seen in a direction of an arrow V in FIG. 3.
Figure 6A:
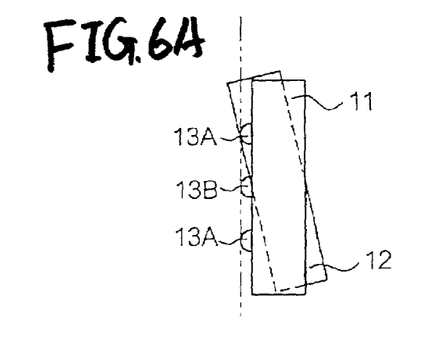
FIGS. 6A, 6B and 6C are views of a first frame and a second frame twisted by thermal expansion, as seen from the same position as in FIG. 5.
Figure 6B:
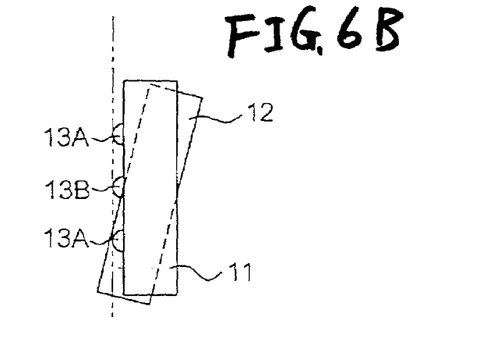
Figure 6C:
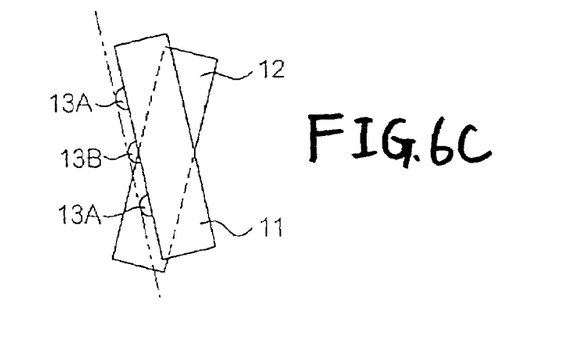

FIG. 5 shows a state in which no displacement has occurred between the first frame 11 positioned in a front side and the second frame 12 positioned in a back side, as seen from a right hand in FIG. 3. FIGS. 6A, 6B and 6C show states in which displacements have occurred between the first frame 11 positioned in the front side and the second frame 12 positioned in the back side, as seen from a direction of an arrow V in FIG. 3.

In these drawings, a mounting plane is shown by a phantom line floating from the frames 11, 12 for convenience, but in fact, the mounting plane is in contact with the frames 11, 12, because the adhesives 13A, 13B are positioned on the side faces 5C, 5D of the half mirror 5.

FIG. 6A shows a state in which the first frame 11 is not displaced, but an upper side of the second frame 12 is twisted toward the half mirror 5, FIG. 6B shows a state in which the first frame 11 is not displaced, but a lower side of the second frame 12 is twisted toward the half mirror 5, and FIG. 6C shows a state in which an upper side of the first frame 11 is twisted toward the half mirror 5, while the lower side of the second frame 12 is twisted toward the half mirror 5.

Thinking here, of a plane of the half mirror 5 defined by the adhesives 13A, 13B, it is found that in case where the half mirror 5 is fixed at the three contact points, the plane formed by the isosceles triangle can be easily defined as described above. On the other hand, in case where the half mirror 5 is fixed at the four contact points, if either one point is misaligned in height, the point will be displaced from the plane defined by the other three contact points.

After the half mirror 5 has been fixed to the frames 11, 12 at the three contact points by the adhesives 13A, 13B, in case where the second frame 12 is displaced as shown in FIG. 6A, the face of the first frame 11 to which the half mirror 5 is attached and the face of the second frame 12 to which the half mirror 5 is attached will not lie on the same plane, and a twist will occur in the half mirror 5. However, in the present embodiment, since the half mirror 5 is fixed to the second frame 12 with the adhesive 13B of the one contact point, there will occur no twist on the mounting plane which is defined by the adhesives 13A, 13B of the three contact points. In this manner, the adhesives 13a, 13b can be prevented from being flaked off from the frames 11, 12.

In the same manner in FIG. 6B, even in case where the face of the first frame 11 to which the half mirror 5 is attached and the face of the second frame 12 to which the half mirror 5 is attached are not on the same plane, no twist will occur on the mounting plane defined by the adhesives 13A, 13B of the three contact points. Therefore, the adhesives 13a, 13b can be prevented from being flaked off.

Further, in the same manner in FIG. 6C, even in case where the face of the first frame 11 to which the half mirror 5 is attached and the face of the second frame 12 to which the half mirror 5 is attached are not on the same plane, no twist will occur on the mounting plane defined by the adhesives 13A, 13B of the three contact points. Therefore, the adhesives 13a, 13b can be prevented from being flaked off.

As described above, in the present embodiment, because the mounting face (the emitting face 5B) of the half mirror 5 is fixed to the frames 11, 12 by the adhesives 13A, 13B of the three contact points dropped on the side faces 5C, 5D, a twist of the mounting plane defined by the adhesives 13A, 13B can be avoided, even though the frames 11, 12 have varied under an influence of thermal expansion. As the results, the half mirror can be rigidly fixed to the frames 11, 12, so that flaking off of the adhesives can be decreased. Consequently, reliability of the holding structure for the half mirror 5 with respect to the frames 11, 12 can be enhanced.

D. Modified Embodiment According to the Invention

The invention is not limited to the above described embodiment, but various modifications as will be described below can be made.

First Modification

Figure 7:
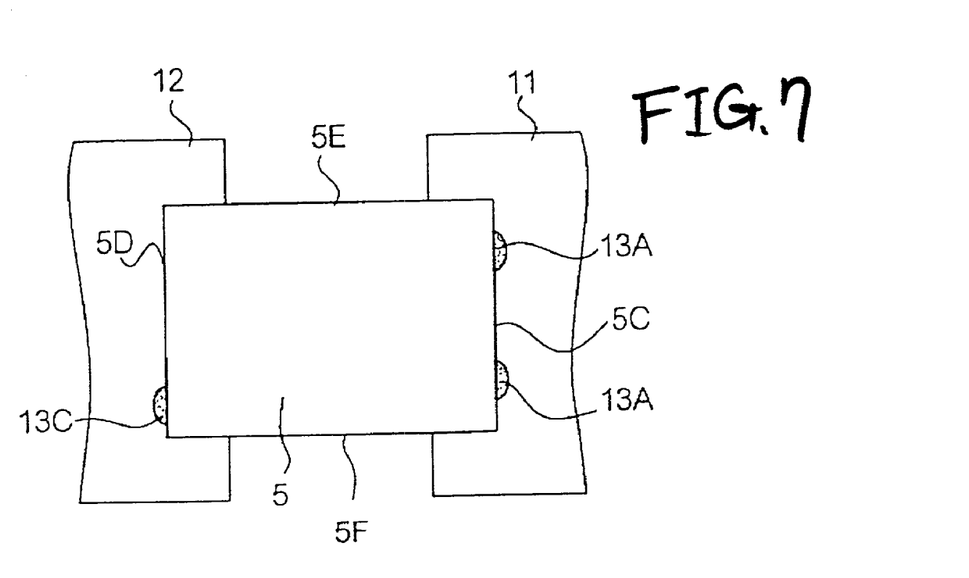
FIG. 7 is a front view of the half mirror according to a first modification in a state attached to the frames.

In the above described embodiment, the case in which the adhesives 13A of the two contact points are positioned near the apexes of the mounting face (the emitting face 5B), and the adhesive 13B of the one contact point is positioned near the end of the emitting face 5B in the center of its shorter edge has been described. However, the invention is not limited to this case, but an adhesive 13C of one contact point may be positioned in a lower part (or in an upper part) of the shorter edge of the emitting face 5B (see FIG. 7). By keeping as large a distance as possible between the adhesives 13A and 13B in this manner, an area of the triangle defined by the adhesives 13 of the three contact points can be increased. With this arrangement, an influence on the mounting face due to displacement of the frames 11, 12 can be more effectively absorbed, and fixing strength can be enhanced.

Second Modification

Figure 8:
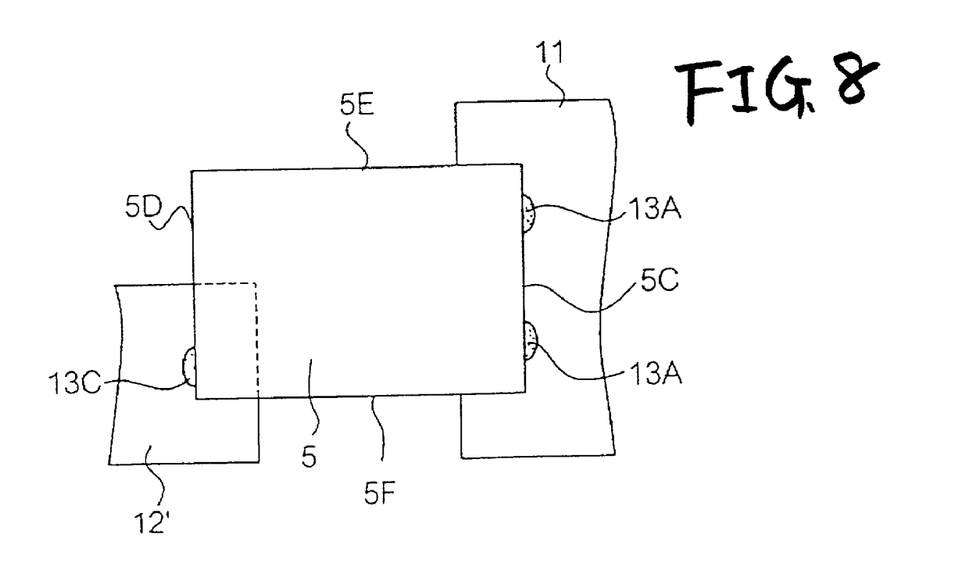
FIG. 8 is a front view of the half mirror according to a second modification in a state attached to the frames.

The second frame to which the half mirror 5 is fixed by the adhesive 13B applied at the one point may be made shorter in width as represented by a second frame 12' in FIG. 8. In this case, a twist of the second frame can be decreased, and an influence on the half mirror 5 can be decreased.

Third Modification

Figure 9:
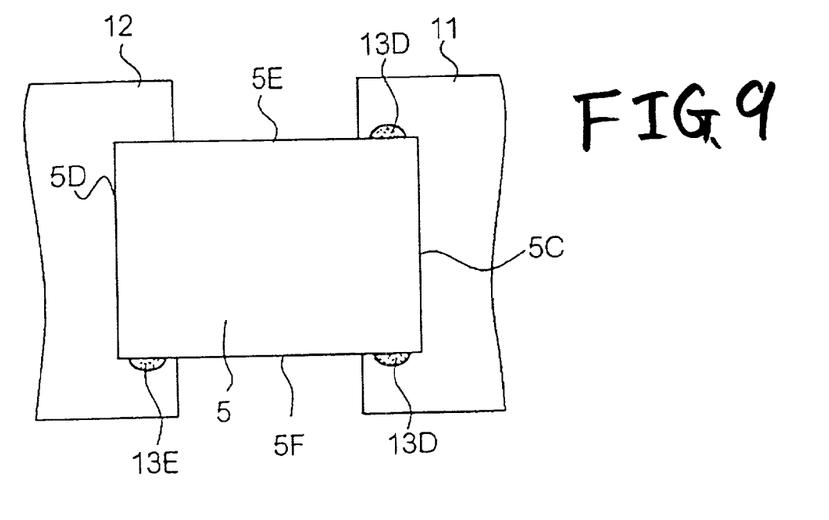
FIG. 9 is a front view of the half mirror according to a third modification in a state attached to the frames.

In the above described embodiment, the adhesives 13A, 13B are provided on the opposed side faces 5C, 5D. However, the invention is not limited to this arrangement, and as shown in FIG. 9, one side of the half mirror 5 may be fixed to the first frame 11 by the adhesives 13D, 13D of the two contact points applied to the side faces 5E, 5F, and the other side of the half mirror 5 may be fixed to the second frame 12 by an adhesive 13E applied to the side face 5F.

Figure 10:
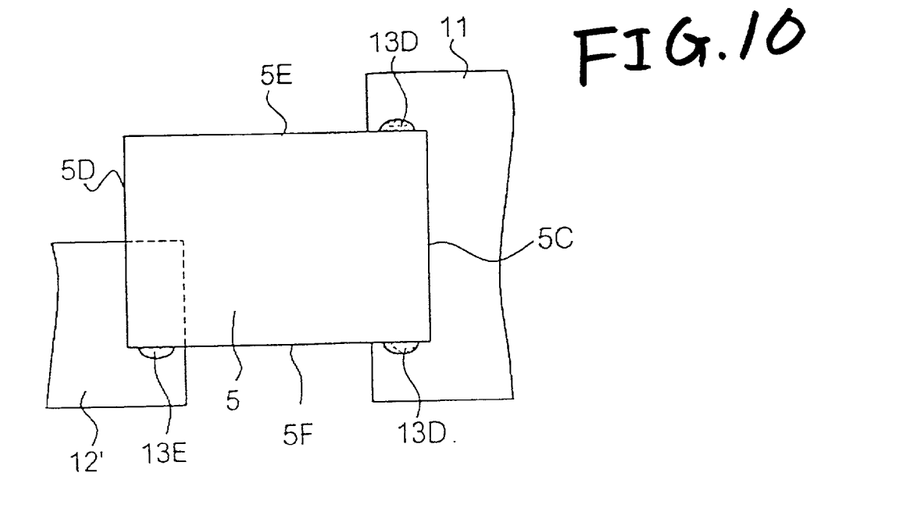
FIG. 10 is a front view of the half mirror according to another modification of the third modification in a state attached to the frames.

Further, this arrangement can be applied to the second frame 12' having a shorter width, as shown in FIG. 10.

Fourth Modification

Figure 11:
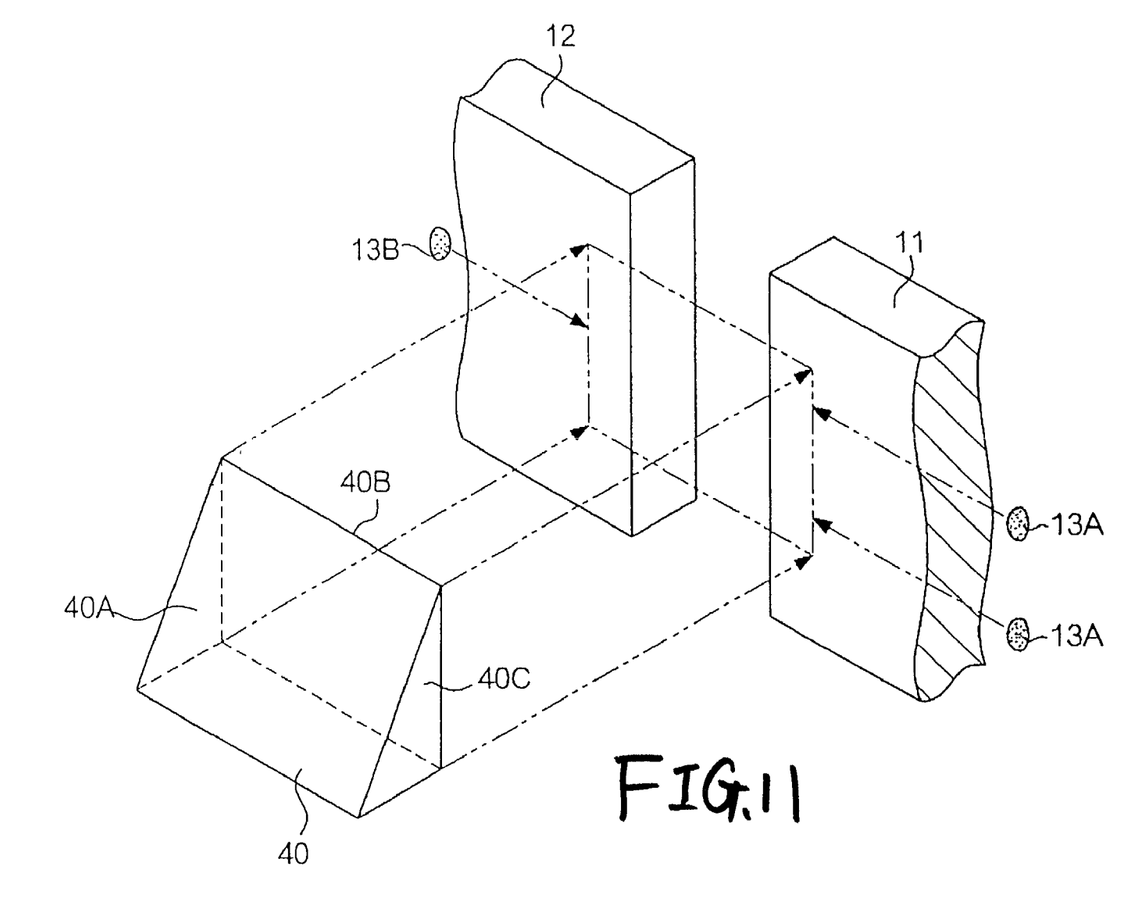
FIG. 11 is an exploded perspective view of a polarizing prism according to a fourth modification before it is fixed to the frames by adhesives at three contact points.

In the above described embodiment, the half mirror 5 has been described as an example of the optical components. However, the invention is not limited to this, but can be applied also to a polarizing prism in a polyhedral shape, as shown in FIG. 11.

In this case, the polarizing prism 40 is in a shape of a polyhedral body (in a shape of a triangular prism) having an incidence face 40A, a mounting face 40B to be attached to the frames 11, 12, and an adjacent face 40C which is adjacent to the mounting face 40B. Furthermore, the invention can be also applied to a polarizing beam splitter or a deflecting mirror, etc.

As described herein above, according to the invention, reliability of the holding structure for the optical component (the half mirror) with respect to a pair of the mounting frames can be enhanced.

What is claimed is:

1. An optical pickup device comprising:
   a light source for irradiating a light;
   a pair of mounting frames which are opposed to each other interposing a space for passing the light from the light source;
   an optical component in a polyhedral shape which is mounted on the mounting frames in a partially overlapped manner and adapted to polarize the light; and
   three adhesive parts, wherein two of the adhesive parts fix one of the faces of the optical component, which are substantially parallel to an optical axis of the light, to one of the pair of mounting frames in two contact points, and one of the adhesive parts fixes the other face of the optical component, which are substantially parallel to an optical axis of the light, to the other mounting frame in one contact point.

2. The optical pickup device according to claim 1, wherein the two of the adhesive parts provided on the one of the mounting frames are arranged remote from each other so that an area of a triangle whose apexes are defined by the three adhesive parts is increased.

3. The optical pickup device according to claim 1, wherein a mounting face of the optical component to be attached to the mounting frames is formed in a rectangular shape, and the two of the adhesive parts are positioned near apexes of the mounting face.

4. The optical pickup device according to claim 1, wherein the other mounting frame has a shorter width than the one of the mounting frames.

5. The optical pickup device according to claim 1, wherein the two of the adhesive parts provided on the one of the mounting frames are arranged remote from each other so that an area of a triangle whose apexes are defined by the three adhesive parts is maximized.

6. An optical pickup device comprising:
   a light source for irradiating a light;
   a pair of mounting frames which are opposed to each other interposing a space for passing the light from the light source;
   a half mirror in a shape of a rectangular parallelepiped thin plate which is mounted on the mounting frames in a partially overlapped manner and adapted to polarize the light; and
   three adhesive parts, wherein two of the adhesive parts fix one of the opposed faces of the half mirror to one of the pair of mounting frames in two contact points, and one of the adhesive parts fixes the other face of the half mirror to the other mounting frame in one contact point.

7. The optical pickup device according to claim 6, wherein the two of the fixing parts provided on the one of the mounting frames are arranged remote from each other so that an area of a triangle whose apexes are defined by the three fixing parts may be increased.

8. The optical pickup device according to claim 6, wherein a mounting face of the half mirror to be attached to the mounting frames is formed in a rectangular shape, and two of the fixing parts are positioned near apexes of the mounting face.

9. The optical pickup device according to claim 6, wherein the other mounting frame has a shorter width than the one of the mounting frames.

10. The optical pickup device according to claim 6, wherein the two of the fixing parts provided on the one of the mounting frames are arranged remote from each other so that an area of a triangle whose apexes are defined by the three fixing parts may be maximized.

11. An optical pickup device, comprising:
    a mounting frame; and
    a half mirror, wherein said half mirror is mounted onto said mounting frame with three contact points, wherein an overlapping area between said mounting frame and said half mirror of one contact point has shorter area than that of two contact point side.

12. An optical pickup device, comprising:
    a mounting frame; and
    a half mirror, wherein a mounting face of said half mirror is partially mounted onto a mounting face of said mounting frame with three adhesive contact points fixing two parallel side faces of said half mirror to the mounting face of said mounting frame, the adhesive contact points substantially constituting a plane in parallel with the mounting face of said half mirror,
    wherein an overlapping area between said mounting frame and said half mirror of a one-contact-point side is shorter than that of a two-contact-point side.

13. The optical pickup device according to claim 12, wherein the mounting frame includes a pair of sub-frames separated from each other.

14. An optical pickup device, comprising:
    a mounting frame; and
    a half mirror, wherein a mounting face of said half mirror is partially mounted onto a mounting face of said mounting frame with three adhesive contact points fixing two parallel side faces of said half mirror to the mounting face of said mounting frame,
    wherein an overlapping area between said mounting frame and said half mirror of a one-contact-point side is shorter than that of a two-contact-point side.

15. The optical pickup device according to claim 14, wherein said three contact points are arranged remote from each other.

16. The optical pickup device according to claim 14, wherein said three contact points are positioned near corners of said half mirror.

17. The optical pickup device according to claim 14, wherein the mounting frame includes a pair of sub-frames separated from each other.

* * * * *